United States Patent [19]

Nolan

[11] 4,052,310

[45] Oct. 4, 1977

[54] SEAL ASSEMBLY

[75] Inventor: John J. Nolan, Cambridge, Mass.

[73] Assignee: Sala Magnetics, Inc., Cambridge, Mass.

[21] Appl. No.: 726,577

[22] Filed: Sept. 27, 1976

[51] Int. Cl.[2] ............ B01D 35/06

[52] U.S. Cl. ............ 210/222; 277/237 R

[58] Field of Search ............ 210/222, 223, 330, 335, 210/359, 390, 398, 406; 34/242, 209; 198/DIG. 950, 803, 339; 220/209, 221, 224; 277/237 R

[56] References Cited

U.S. PATENT DOCUMENTS

| | | | |
|---|---|---|---|
| 1,046,685 | 12/1912 | Ullrich | 209/222 |
| 1,765,252 | 6/1930 | Vernay | 210/330 X |
| 1,867,546 | 7/1932 | Baer | 34/242 |
| 2,289,753 | 7/1942 | Capstaff | 34/242 |
| 2,472,724 | 6/1949 | Peuney | 34/242 X |
| 2,492,460 | 12/1949 | Botelho | 198/803 |
| 2,732,631 | 1/1956 | Black | 34/242 X |
| 2,935,200 | 5/1960 | Lutz et al. | 210/330 |
| 3,912,634 | 10/1975 | Havell | 210/222 |
| 3,920,543 | 11/1975 | Marston et al. | 210/222 |
| 3,942,674 | 3/1976 | Nelson | 220/221 |

*Primary Examiner*—Theodore A. Granger

*Attorney, Agent, or Firm*—Joseph S. Iandiorio

[57] ABSTRACT

A seal assembly for sealing the edges of a compartment and an adjacent surface which move relative to each other, including a resilient, transverse seal at the front and rear edges of the compartment arranged transversely of the direction of relative motion between the surface and compartment, each transverse seal extending a distance beyond the compartment greater than the distance between the surface and the compartment for enabling each transverse seal to bend rearwardly relatively to the direction of motion and firmly, sealingly engage the surface; and a resilient, longitudinal seal at each side edge of each compartment arranged generally longitudinally to the direction of relative motion between the surface and compartment, each longitudinal seal extending a distance beyond the compartment greater than the distance between the surface and compartment for enabling each longitudinal seal to be bent inwardly of the compartment, firmly, sealingly engage the surface and firmly clamp and sealingly engage the transverse seals after they have adjusted to the distance between the compartment and surface, and provide a positive seal about the edges of the compartment and against the surface.

10 Claims, 19 Drawing Figures

SEAL ASSEMBLY

FIELD OF INVENTION

This invention relates to a seal assembly for sealing the edges of a compartment and an adjacent surface between which there is relative motion, in which longitudinal seals clamp and hold transverse seals; and more particularly to such a seal assembly in which the transverse seals are clamped in position after they have adjusted to the gap height between the compartment and surface.

BACKGROUND OF INVENTION

Certain types of magnetic separators use a structure of ferromagnetic material capable of retaining magnetic particles when magnetized and releasing them when de-magnetized. Such separators are used to separate the more magnetic components from a mixture of finely divided more and less magnetic particles carried by a stream of liquid (generally referred to as wet separations) or gas (generally referred to as dry separations) through the structure in question. Depending on factors such as the particle sizes involved, the structure in question may be a stack of grooved iron plates or a matrix of finely divided ferromagnetic filamentary material such as steel wool, wire mesh, or expanded metal. When the magnetic components to be removed constitute only a small fraction of the feed material, such as in the purification of kaolin for example, or in removing particulates from waste water, the matrix of magnetic material can be contained in a stationary canister and operated cyclically. The matrix is magnetized to collect magnetic particles until it is loaded to saturation, whereupon the magnetic field is turned off and the matrix is purged by a stream of liquid or gas. However, when the magnetic components to be removed constitute a major fraction of the feed material, as in the beneficiation of iron ores for example, the matrix becomes saturated too quickly to make cyclic operation practical. For such applications it is preferable to advance the matrix continuously through successive processing stations. The feed mixture, carried by liquid or gas, is introduced continuously in a region of magnetic field in a feed station, where the less magnetic particles pass through the matrix structure and exit through a discharge aperture, while the more magnetic particles are retained in the matrix structure and are carried out of the region of magnetic field, to be flushed or blown out in a region of zero (or near zero) magnetic field at a flush station. In addition, a rinsing stream is often used in a rinse station in a region of magnetic field in order to remove less magnetic particles which have become mechanically trapped in the matrix.

In such devices, the matrix is customarily carried in compartments or boxes, open at each end to provide for the inlet of the feed material at one end (the inlet end) and to provide for an outlet at the opposite end; these compartments may be part of a rigid cylinder or annulus, or they may be linked together to form an endless chain. In the prior art feed, slurry, and washing fluid is usually introduced in the open, that is by a nozzle or flow tube. Flexible gaskets or lips are sometimes used to confine the flow, but these are only spray deflectors rather than positive seals. The abrasive nature of granular slurries makes close tolerances difficult to maintain; and rubber gaskets or lips, particularly those in the transverse direction, tend to be too flexible to withstand any significant pressure differential.

Nevertheless, it is very important in several applications to maintain a positive seal between the matrix compartments and the outside, as well as between adjacent matrix compartments. There are several reasons for this requirement.

It is often desirable in wet separations to keep the matrix continuously submerged or flooded in order to maintain uniform slurry distribution and velocity, and to control the value of this flow velocity. Without seals the feed material, moving under the influence of gravity, might flow at an inconveniently high or inconveniently low rate. With seals the feed material can be made to flow at a predetermined optimized rate; and can even be made to flow vertically upward (relative to the direction of the gravity force). In particular, back flushing of the matrix, in a direction opposite to that in which it was fed, is possible with the aid of seals. Frequently it is advantageous to perform intermediate rinsing operations at higher pressure and velocity in order to remove intermediately magnetic particles or middlings, while the matrix is still in the magnetic field region, or to remove or flush mechanically trapped highly magnetic particles when the matrix is out of the magnetic field region. A positive seal is particularly important when handling materials which are either too valuable or too toxic to be permitted to leak out of the machine. In the case of dry separations the dusk leaking from a magnetic separator can represent an explosion hazard and/or a health hazard if inhaled. Seals also facilitate handling of viscous slurries.

Generally, seals allow operation at higher or lower pressure relative to atmospheric pressure. Air entrainment is often undesirable in wet separations and seals allow air entrainment to be reduced or eliminated.

SUMMARY OF INVENTION

It is therefore an object of this invention to provide a simple, yet highly effective seal assembly for positively sealing a compartment and adjacent surface between which there is relative motion.

It is a further object of this invention to provide such a seal assembly capable of withstanding a significant pressure differential.

It is a further object of this invention to provide such a seal assembly without exceptionally close or impractical dimensional tolerances.

It is a further object of this invention to provide such a seal assembly that prevents material introduced at any of the various inlets from reaching any of the various outlets by any path except a path through the matrix.

It is a further object of this invention to provide such a seal assembly which substantially reduces wear and moving friction.

It is a further object of this invention to provide such a seal assembly which easily adjusts to variations in the gap height between the compartment and associated surface.

It is a further object of this invention to provide continued sealing for long periods of time notwithstanding wear of the seal material and the associated surface.

It is a further object of this invention to provide such a seal assembly capable of easy, rapid repair or replacement.

The invention results from the realization that a pair of transverse seals carried by a compartment may be made sufficiently soft and resilient in one direction to rapidly and easily adjust to sealingly engage an associated surface through wide variations in distance between the compartment and surface and yet be relatively, rigidly and securely locked in position once they have adjusted to the sealing engagement by the use of a pair of independent soft, resilient, longitudinal seals which also rapidly and easily adjust to sealingly engage an associated surface through wide variations in distance between the compartment and surface.

The invention features a seal assembly for sealing the edges of a compartment and an adjacent surface which move relative to each other. The seal assembly includes a set of seals including a resilient transverse seal at the front and rear edges of each compartment and arranged transversely of the direction of relative motion between the surface and compartment. Each transverse seal extends a distance beyond the compartment greater than the distance between the surface and the compartment for enabling each transverse seal to be bent rearwardly relative to the direction of motion and firmly, sealingly engage the surface.

This rearward bending increases the resistance to deflection caused by the differential pressure acting across the seal, and resistance to deflection in this direction may be further increased by metal wires or the like buried in the seal or attached to its surface.

The set of seals also includes a resilient longitudinal seal at each side edge of each compartment arranged generally longitudinally to the direction of relative motion between the surface and compartment. Each longitudinal seal extends a distance beyond the compartment greater than the distance between the surface and compartment for enabling each longitudinal seal to be bent inwardly of the compartment, firmly and sealingly engage the surface and firmly clamp and sealingly engage the transverse seals after they have adjusted to the distance between the compartment and surface, and provide a positive seal about the edges of the compartment and against the surface.

The soft and resilient material of which the seals are made might contain metal wires or other additions to increase the relative stiffness or resistance to bending in a direction perpendicular to the direction of bending referred to above, such as may be required, for example, to accommodate higher differential pressure across the seal.

In preferred embodiments, the compartment is moving and the adjacent surface is stationary, and the compartment has an inlet end and an outlet end and there is a set of transverse and longitudinal seals on each end.

DISCLOSURE OF PREFERRED EMBODIMENT

Other objects, features and advantages will occur from the following description of a preferred embodiment and the accompanying drawings, in which.

The invention may be accomplished using a seal assembly for sealing the edges of a compartment and an adjacent surface which move relative to each other. Typically the seal assembly includes a set of seals which include both transverse and longitudinal seals. Preferably transverse seals are located at the front and rear edges of each compartment transversely to the direction of relative motion between the surface and compartment. Each of the transverse seals extends a distance beyond the compartment greater than the distance between the surface and the compartment for enabling each of the transverse seals to be bent rearwardly relative to the direction of motion and firmly sealingly engage the surface. There are resilient longitudinal seals at each side edge of each compartment arranged generally longitudinally to the direction of relative motion between the surface and compartment. Each of the longitudinal seals extends a distance beyond the compartment greater than the distance between the surface and the compartment for enabling each of the longitudinal seals to be bent over inwardly of the compartment and firmly, sealingly engage the surface while firmly clamping and sealingly engaging the transverse seals after they have adjusted to the distance between the compartment and surface, and thereby provide a positive seal about the edges of the compartment and against the surface.

Typically each compartment has an inlet end and an outlet end and includes a set of transverse and longitudinal seals on each end. The transverse and longitudinal seals may each be a type of simple flapper element or the longitudinal seal may have a generally triangular cross-section.

Figure 1:
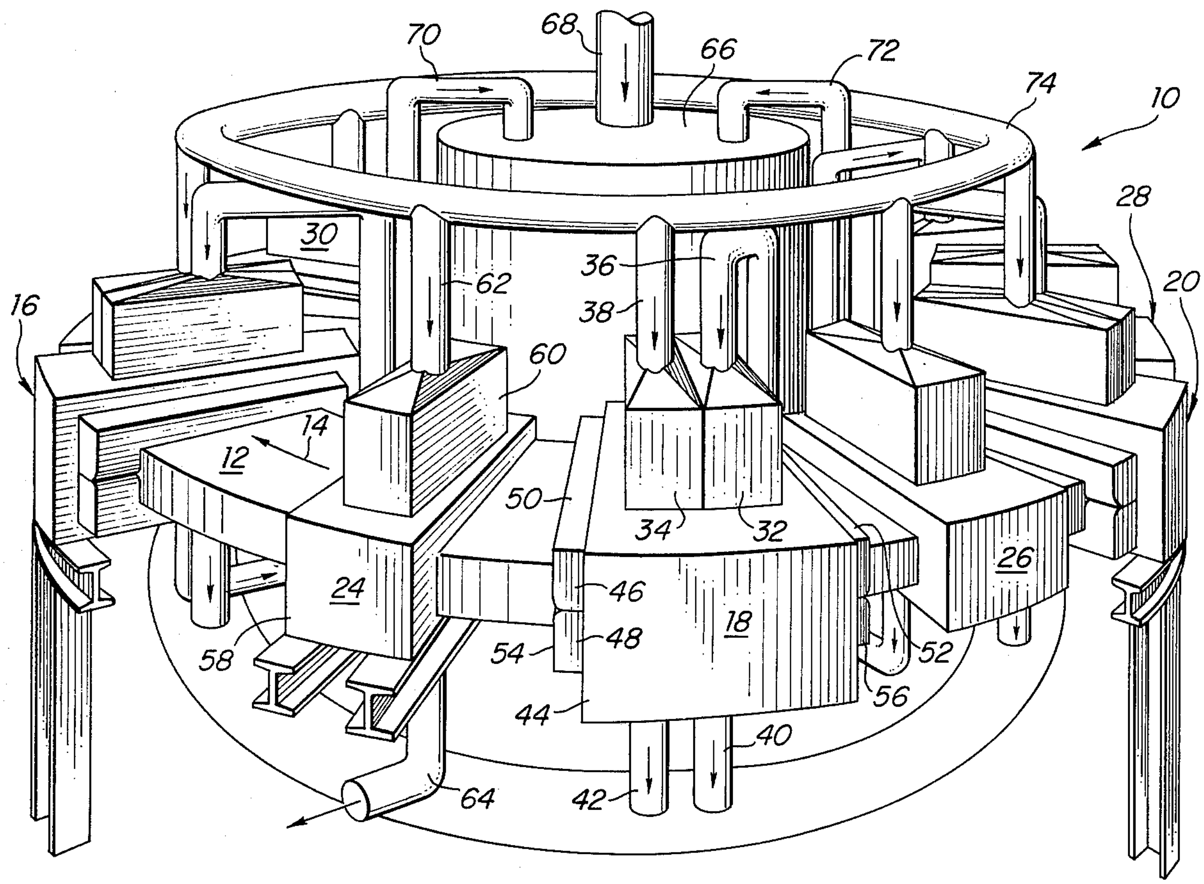
FIG. 1 is a schematic, axonometric view of a moving matrix magnetic separator in which may be used the seal assembly according to this invention.
Figure 2:
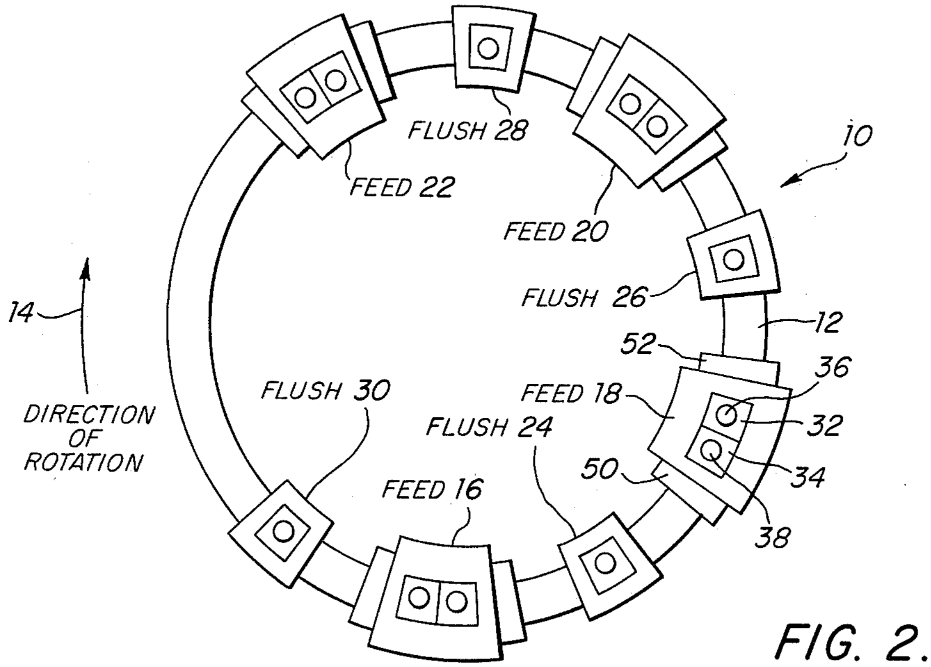
FIG. 2 is a diagrammatic, plan view of the separator shown in FIG. 1.

The seal assembly according to this invention may be used in a moving matrix magnetic separator 10, FIG. 1, which includes a horizontal matrix member 12 rotatable about its center in the direction of arrow 14 by drive means not shown. Spaced above the path of matrix member 12 are a plurality of processing stations, feed stations 16, 18, 20, and 22, FIG. 2; and a plurality of flush stations 24, 26, 28 and 30.

Figure 4:
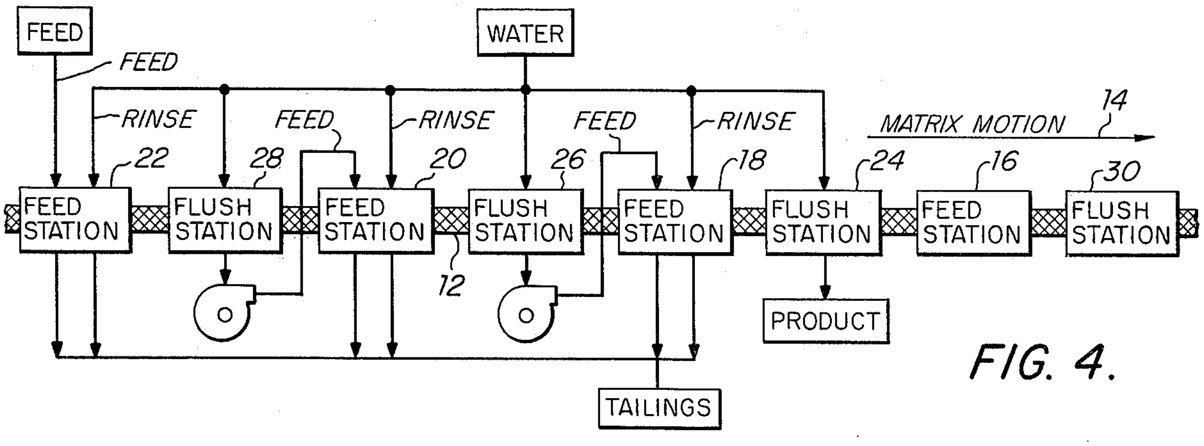
FIG. 4 is a schematic flow chart of one interconnection system which may be used with a separator of FIGS. 1 and 2.
Figure 3:
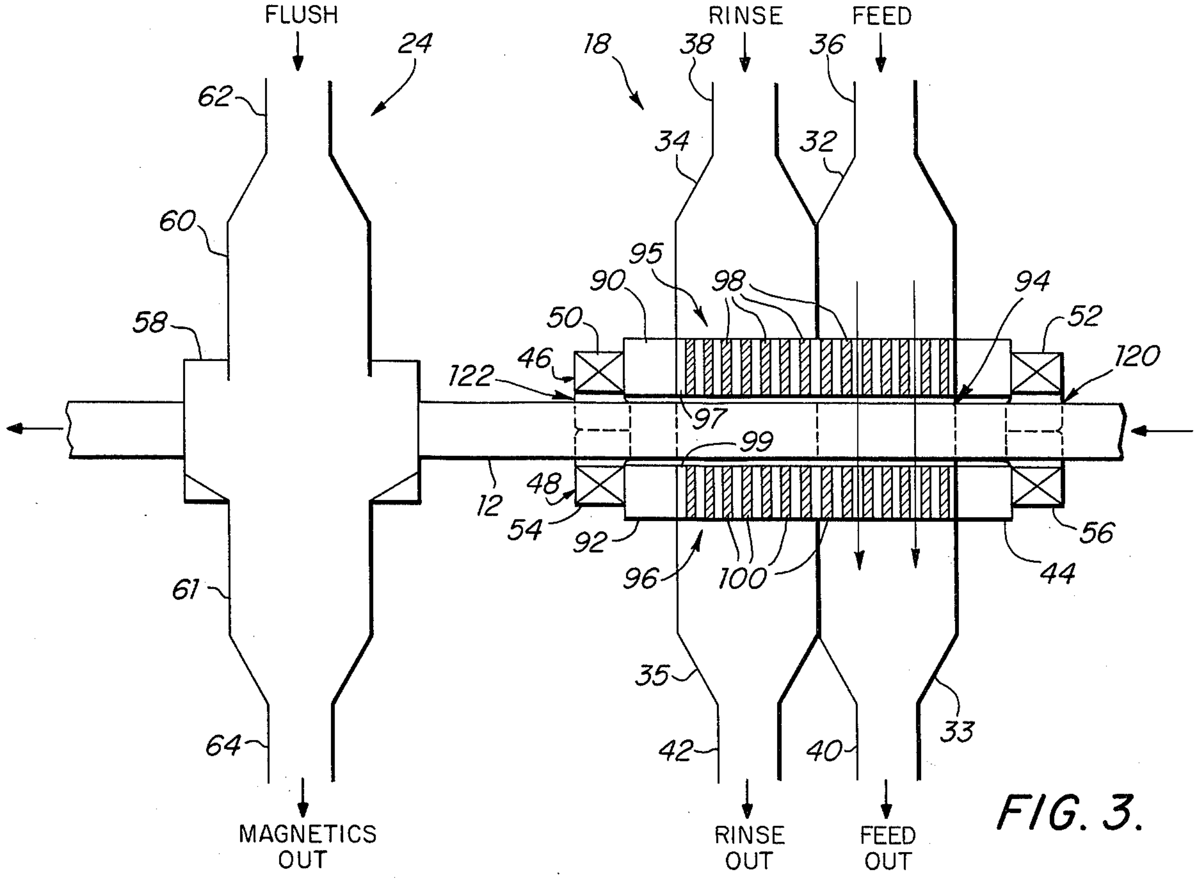
FIG. 3 is an enlarged, diagrammatic sectional side view of a feed station and flush station of the separator shown in FIG. 1.

Each feed station exemplified by feed station 18, FIG. 1, includes a feed inlet 32 and a rinse inlet 34 which are fed by feed pipe 36 and rinse pipe 38, respectively, as well as a feed outlet 33 and rinse outlet 35, FIG. 3, which have corresponding feed outlet pipe 40 and rinse outlet pipe 42. Within housing 44, FIG. 1, is a split coil or a pair of coils 46 and 48 whose ends 50, 52, and 54, 56 are bent backwardly to provide apertures 120, 122, FIG. 3, at each end of housing 44 to permit the movement of matrix member 12 therethrough. Each flush station as exemplified by flush station 24, FIG. 1, includes a housing 58, FIG. 3, a flush inlet 60 connected to flush inlet pipe 62 and a flush outlet 61, connected to a flush outlet pipe 64. Raw feed is supplied to the feed inlet pipes which are connected to the feed reservoir 66, FIG. 1. Feed reservoir 66 may receive the raw feed from external sources through inlet pipe 68 or through inlet pipes 70 and 72 from the feed, rinse and flush outlets of various stations of the machine depending upon the system design. Similarly, rinse inlets and flush inlets may receive clean water, or outputs from previous or successive stations or any other fluid or combination of fluids through pipe 74 or other pipes in accordance with the system design. A detailed flow chart is shown in FIG. 4 to illustrate a specific system design which may be implemented with the magnetic separator.

Figure 5:
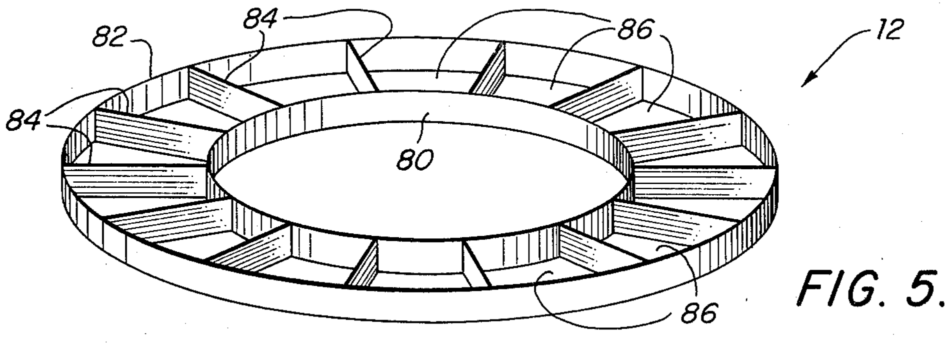
FIG. 5 is a diagrammatic, axonometric view of a support for the matrix of FIG. 1.

Matrix member 12, FIG. 5, may be formed with an inner peripheral member 80 connected to an outer peripheral member 82 by means of walls 84 between which, in compartments 86, is located the matrix medium such as steel wool, steel balls, tacks or the like, here omitted for clarity. In a machine such as machine 10, FIG. 1, where the matrix member 12 is an annulus, members 80 and 82 are circular rings and the matrix member is constructed as a single continuous annulus.

Each feed station as exemplified by feed station 18, FIG. 3, includes a pole unit including a first ferromagnetic pole member 90 and a second ferromagnetic pole member 92 aligned with the first pole member 90 and spaced from the first pole 90 and a working magnetic field volume or gap 94 formed between pole members 90 and 92. Located in each pole member 90 and 92 are inlet means 95 and outlet means 96 for permitting the introduction and removal of feed or rinse or any other fluid to the portion of the matrix member 12 presently within the working volume 94. Surfaces 97, 99 on inlet 95 and outlet 96 cooperate with the seals of this invention as is explained, infra. Inlet means 95 is shown specifically as a plurality of ferromagnetic members or plates 98 spaced from each other in the direction of motion of matrix member 12 and extending transversely across the path of matrix member 12. Outlet means 96 is similarly formed from ferromagnetic members or plates 100 similarly spaced from each other in the direction of motion of matrix member 12 and transverse to the direction of motion of matrix member 12. Plates 98 and 100 are arranged to direct the flow of the fluid in the matrix so that it is parallel to the magnetic field extending in the gap between poles 90 and 92. Following feed station 18 in sequence is flush station 24 in which the housing 58 may include, FIG. 3, simply a box in which the flush liquid entering through inlet 60 may be passing through the portion of the matrix member then present in housing 58.

Figure 7:
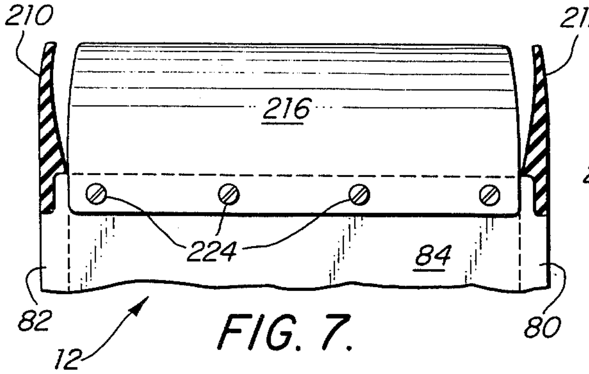
FIG. 7 is a view taken along line 7—7 of FIG. 6 showing a transverse seal and associated longitudinal seals before they have entered a station and assumed a clamped, positive, sealing configuration.
Figure 6:
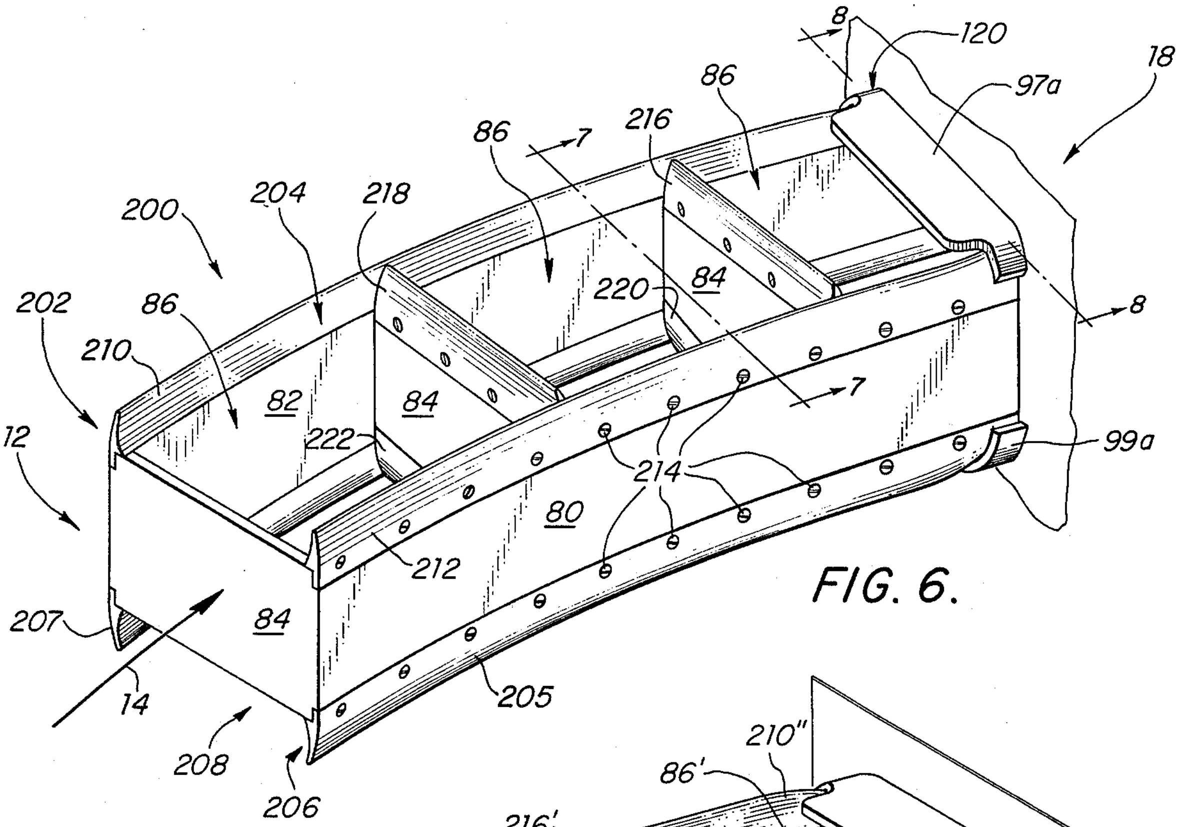
FIG. 6 is an axonometric, diagrammatic view of a portion of an annular rotary matrix including a seal assembly according to this invention.

A seal assembly 200, FIG. 6, according to this invention, includes two sets of seals, one set of seals 202 on the inlet end 204 of each compartment 86, and the second set of seals 206 on the outlet end 208 of each compartment 86. The set of seals 202 includes longitudinal seals 210 and 212 mounted by means such as screws 214 on the longitudinal edges of compartments 86 and transverse seals 216, 218 on the front and rear edges of each compartment 86. In FIG. 6, since each of the walls 84 is common to two compartments, transverse seals 216 and 218 are shared in common by adjacent pairs of compartments. The same is true with respect to transverse seals 220 and 222, which are included in set of seals 206 at the outlet end 208 of the compartments which are associated with longitudinal seals 205 and 207 in the outlet set of seals 206. Optional auxiliary sealing surfaces *97a* and *99a* are located in aperture 120 to aid in guiding the seal into a positive sealing configuration. The transverse sealing elements as typified by transverse element 216, FIG. 7, are typically flapper elements which are fastened to the wall 84 by means of screws 224. Between stations the flapper element 216 as well as the longitudinal flapper elements, seal 210 and 212 extend generally upright for a distance which is greater than the distance from the top of the compartment to the sealing surface 97. However, as transverse seal 216 encounters auxiliary sealing surface *97a*, FIG. 8, as it enters aperture 120, it is bent backwards and quickly adjusts to the distance between the top of compartment 84 and sealing surface 97, even though this distance may vary somewhat from station to station and even from place to plate within the station.

Surfaces *97a*, *99a*, FIG. 6, with extensions or tongues *97b*, *99b* (not visible) preferably extend, on either end of feed station 16, beyond the ends of inlet 95 and outlet 96, FIG. 3, a distance which is at least greater than the length of a compartment 86 between successive transverse seals 216, 218. This is so to insure that there is at least one complete seal engagement with the sealing surface at either end of a compartment as it moves through the feed station. Sealing surfaces may be used on the flush stations as well.

Subsequent to this rearward bending of flapper element or seal 216, the longitudinal seals 210 and 212 are bent inward also to adjust to the distance between the top of the compartment 86 and sealing surface 97, which is somewhat less than their height above compartment 86. And, as they are bent inward, they clampingly engage the ends of transverse seal 216 and make a positive and secure seal about the compartment, and between it and sealing surface 97. The transverse and longitudinal seals in the outlet set of seals 206 are similarly treated by their adjacent sealing surface.

Figure 8:
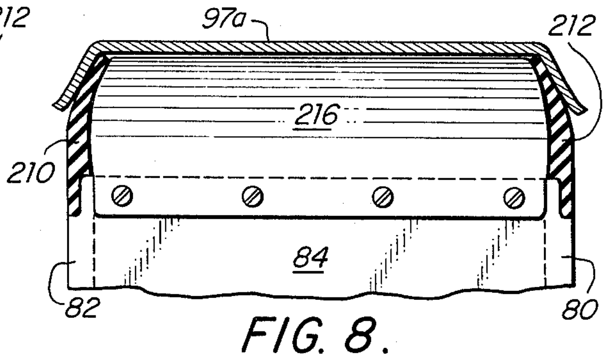
FIG. 8 is a view similar to FIG. 7 taken along lines 8—8 of FIG. 6, showing the seals after they have been clamped together in the positive sealing configuration.
Figure 9:
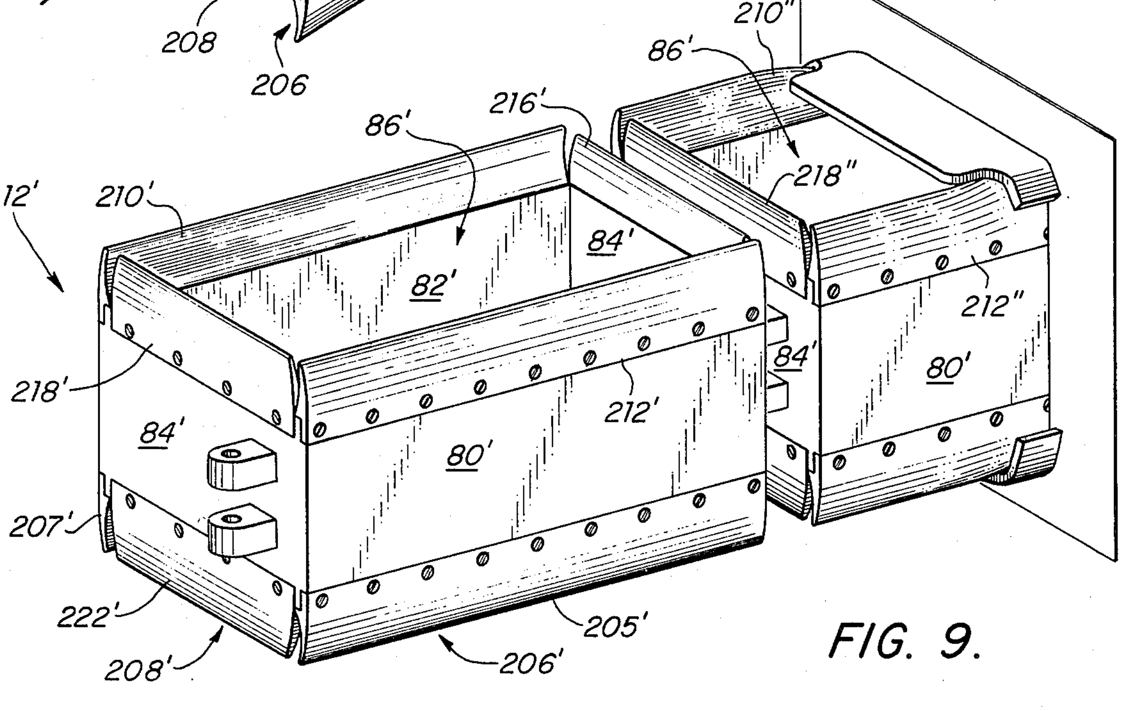
FIG. 9 is an axonometric diagram similar to FIG. 6 of a portion of a matrix made up of separate articulated compartments.

In the machines such as shown in FIG. 9, where like parts have like numbers primed with respect to FIGS. 6, 7, and 8, wherein each compartment 86' has its own separate front and rear walls 84' not in common with those walls of adjacent compartments, the longitudinal seals 210' and 212' may be limited in length to the length of each of the compartments 210', 212', 210'',212''; and each wall 84' of each compartment 86' has its own set of transverse seals 216′, 218′, 218″. Coupling means are required if compartments are to be pulled through feed and flush stations, but can be eliminated if pushed through instead. In either case the space between the rear wall of each compartment and the front wall of the adjacent compartment should be minimized. Empty space between compartments might be filled with foam rubber to prevent excessive leakage through this space.

Figure 10:
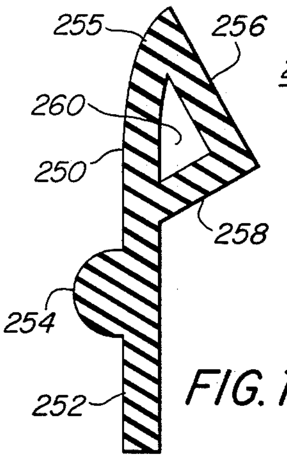
FIG. 10 is a sectional diagram of an alternative configuration for a longitudinal seal according to this invention.
Figure 11:
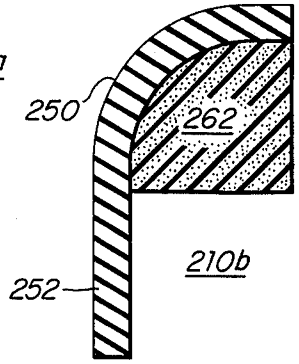
FIG. 11 is a sectional diagram of another alternative configuration for a longitudinal seal.

Instead of being merely simple flapper elements, seals 210 and 212 may be a more complex construction, such as indicated by seal 210*a*, FIG. 10, which is generally triangular in cross section and has a first side 250 with an extension 252 for fastening to the compartment. This construction makes the longitudinal seals relatively flexible for bending required as above, yet, once the seal has been formed, the seals resist deflection under the influence of the differential pressure across the seal. A detent 254 may be provided for locking seal 210*a* in a groove in the compartment to eliminate the necessity for screws or other auxiliary fastening means. A bearing surface 255 for engaging with the sealing surface is formed at the junction of side 250 and side 256. Side 258 is provided to bear on and engage the compartment. Seal 210*a* is made with a hollow passage 260. Alternatively, it may be made solid, seal 210*b*, FIG. 11, with a substantial portion of the triangular section being made of a softer material such as foam rubber 262.

Figure 12:
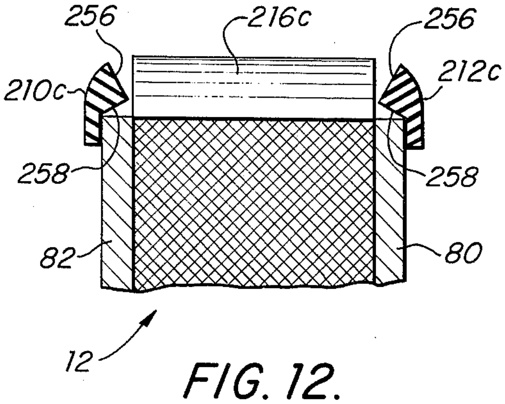
FIG. 12 is a diagrammatic sectional view of a portion of a matrix showing yet another alternative longitudinal seal structure with the seals in the open position before they have clamped the transverse seal and formed a positively sealed configuration.
Figure 13:
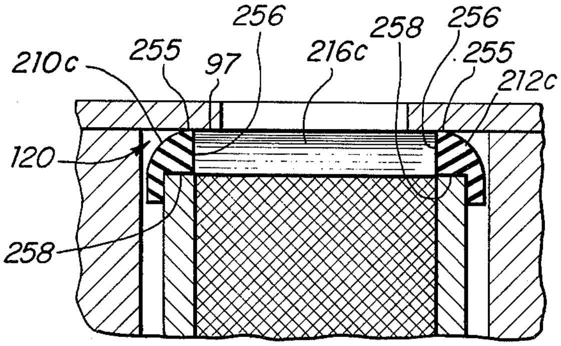
FIG. 13 is a sectional diagram similar to FIG. 12, showing the seals in the clamped, positively sealed configuration.

Alternatively, seals 210*c* and 212*c*, FIG. 12, may be configured similarly to seal 210*a* but without hollow passage 260. Between stations, transverse element 216*c* rides substantially straight up, and seals 210*c* and 212*c* rotate outwardly so that their sides 258 are raised from the walls 80, 82 of matrix 12 and their sides 256 are not in contact with transverse seal 216*c*. Upon entering aperture 120 and encountering sealing surface 97, transverse seal 216*c*, FIG. 13, bends over backwards to adjust to the space between the top edge of the compartment and surface 97. Longitudinal seals 210*c* and 212*c* are bent downwardly and inwardly to also accommodate the reduced distance between the top edge of the compartment and surface 97, so that their surfaces 258 now contact the top edges of the compartment. Their edges 256 clamp transverse seal 216*c* and their bearing surfaces 255 engage sealing surface 97.

Figure 14:
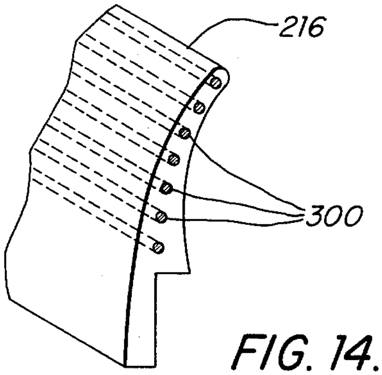
FIG. 14 is an axonometric cross sectional view of a transverse seal with wire stiffeners.
Figure 15:
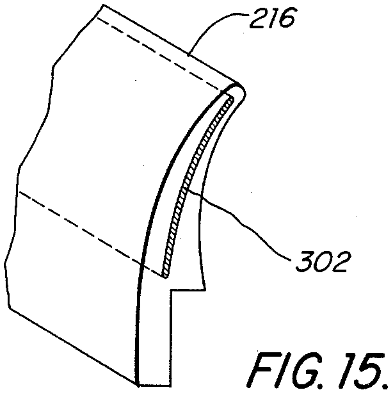
FIG. 15 is an axonometric cross-sectional view of a transverse seal with sheet stiffeners.
Figure 17:
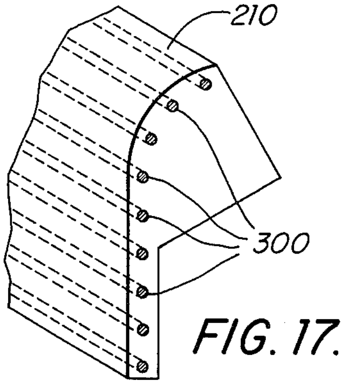
FIG. 17 is an axonometric cross-sectional view of a longitudinal seal with wire stiffeners.
Figure 19:
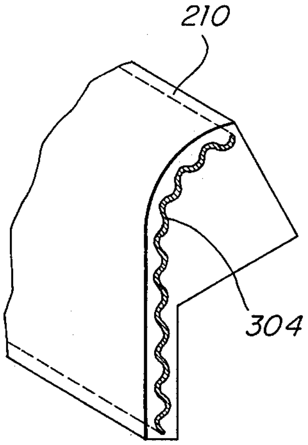
FIG. 19 is an axonometric cross-sectional view of a longitudinal seal with corrugated stiffeners.
Figure 18:
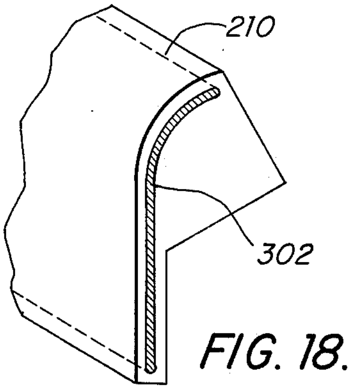
FIG. 18 is an axonometric cross-sectional view of a longitudinal seal with sheet stiffeners.
Figure 16:
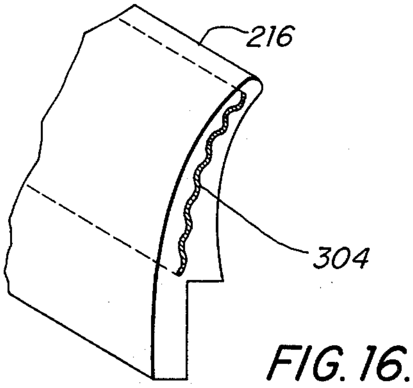
FIG. 16 is an axonometric cross-sectional view of a transverse seal with corrugated stiffeners.

Transverse seals 216 may be stiffened along their length but left flexible to enable rearward bending by the use of wires 300, FIG. 14, metal sheet or band 302, FIG. 15, or corrugated material 304, FIG. 16. Similar reinforcement may be used in the peripheral seals 210, 212, FIGS. 17, 18, 19, as long as those seals are not too curved.

Other embodiments will occur to those skilled in the art and are within the following claims.

What is claimed is:

1. In a moving matrix magnetic separator in which a multi-compartment matrix moves through at least one processing stationa matrix device with a pair of spaced apart, longitudinal edges and at least one transverse edge extending between them;

a resilient, transverse seal at said transverse edge of said device arranged transversely of the direction of relative motion between the processing station and said device, said transverse seal extending a distance beyond said device greater than the distance between a surface of said station and said device, and constructed and arranged to be bent rearwardly from a direction of motion to firmly, sealingly engage the surface; and a resilient, longitudinal seal at each said longitudinal edge of said device arranged generally longitudinally to the direction of relative motion between the surface and said device; each said longitudinal seal extending a distance beyond said device greater than the distance between a surface of said station and said device for enabling each said longitudinal seal to be bent inwardly of said device, and firmly, sealingly engage said surface, and being constructed and arranged to sealingly engage opposite ends of said transverse seal when bent inwardly.

2. The seal assembly of claim 1 in which said device includes two spaced apart transverse edges and has a said transverse seal associated with each.

3. The seal assembly of claim 1 in which said device has an inlet end and an outlet end and includes said transverse and longitudinal seals on each end.

4. The seal assembly of claim 1 in which each said transverse seal includes a flapper element.

5. The seal assembly of claim 1 in which each said transverse seal includes stiffening means.

6. The seal assembly of claim 1 in which each said longitudinal seal includes a generally triangular cross-section member having an extension of a first side for fastening to said device and forming a bearing surface proximate its junction with a second side, which engages said transverse seal and a third side which bears on said device.

7. The seal assembly of claim 1 in which each said longitudinal seal includes stiffening means.

8. The seal assembly of claim 6 in which said member is hollow.

9. In a moving matrix magnetic separator in which a multicompartment matrix moves through at least one processing station having an inlet and an outlet for fluid to be processed and a stationary surface proximate each inlet and outlet and spaced from the matrix, a sealing assembly including at least one set of seals sealing the edges of each compartment with at least one of the associated surfaces, comprising:

a resilient, transverse seal at the front and rear edges of each said compartment arranged transversely of the direction of relative motion between the surface and compartment, each said transverse seal extending a distance beyond the compartment greater than the distance between the surface and the compartment for enabling each said transverse seal to be bent rearwardly relative to the direction of motion and firmly, sealingly engage said surface; and a resilient, longitudinal seal at each side edge of each said compartment arranged generally longitudinally to the direction of relative motion between the surface and compartment, each said longitudinal seal extending a distance beyond the compartment greater than the distance between the surface and compartment for enabling each said longitudinal seal to be bent inwardly of said compartment and firmly, sealingly engage said surface and being constructed and arranged to sealingly engage opposite ends of said transverse seals when bent inwardly.

10. In a moving matrix magnetic separator in which a multi-compartment matrix moves through at least one processing station, a compartment sealing assembly comprising:

a matrix device with spaced apart front and rear transverse edges and spaced apart side longitudinal edges defining said compartment;

a resilient, transverse seal at the front and rear edges of each said device arranged transversely of the direction of relative motion between the surface of said processing station and said device, each said transverse seal extending a distance beyond the device greater than the distance between the said surface and the device and constructed and arranged to be bent rearwardly from a direction of motion to firmly, sealingly engage said surface; and a resilient, longitudinal seal at each side edge of each said device arranged generally longitudinally to the direction of relative motion between said surface and device, each said longitudinal seal extending a distance beyond the device greater than the distance between said surface and device for enabling each said longitudinal seal to be bent inwardly of said device and firmly, sealingly engage said surface, and being constructed and arranged to sealingly engage opposite ends of said transverse seals when bent inwardly.

* * * * *